United States Patent
Iwamura et al.

(10) Patent No.: US 8,249,459 B2
(45) Date of Patent: Aug. 21, 2012

(54) METHOD AND APPARATUS FOR GENERATING TIME-DIVISION MULTIPLEXED ENCODED TRANSMISSION SIGNAL

(75) Inventors: Hideyuki Iwamura, Tokyo (JP); Hiromi Tsuji, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 412 days.

(21) Appl. No.: 12/656,295

(22) Filed: Jan. 25, 2010

(65) Prior Publication Data

US 2010/0215373 A1    Aug. 26, 2010

(30) Foreign Application Priority Data

Feb. 23, 2009    (JP) .................................. 2009-038877

(51) Int. Cl.
*H04J 14/08*    (2006.01)
(52) U.S. Cl. ............................ 398/102; 398/75; 398/161
(58) Field of Classification Search ................ 398/75, 398/102, 161
See application file for complete search history.

(56) References Cited

U.S. PATENT DOCUMENTS

| | | | |
|---|---|---|---|
| 6,775,478 B2 * | 8/2004 | Suzuki et al. | 398/75 |
| 7,974,542 B2 * | 7/2011 | Kagawa | 398/188 |
| 2010/0054738 A1 * | 3/2010 | Yuki | 398/65 |
| 2010/0067914 A1 * | 3/2010 | Tanaka et al. | 398/102 |

OTHER PUBLICATIONS

"Study of OTDM Channel Identifying Technique Using FBG Type Optical Encoder" in Ref. 1 Proceedings of the 2007 Communications Society Conference of the Institute of Electronics, Information and Communication Engineers, B-10-60, 2007.

* cited by examiner

*Primary Examiner* — Leslie Pascal
(74) *Attorney, Agent, or Firm* — Rabin & Berdo, P.C.

(57) ABSTRACT

The present invention provides a method of generating time-division multiplexed encoded transmission signals, including encoding optical pulse signals for each of a plural multiplexed channels and generating a transmission signal for each channel, performing time division multiplexing on first and second transmission signals and generating a 2-channel multiplexed signal modulating the multiplexed signal with a modulation signal having a frequency of $(F-\Delta f)$ Hz, detecting a strength of a $\Delta f$ Hz frequency component of the multiplexed signal changing a time delay amount of the second transmission signal with respect to the first transmission signal, and determining a time delay amount at which a strength of the $\Delta f$ Hz frequency component is minimized and adjusting the transmission signals of the individual channels such that they are arranged at equidistant intervals on a time axis.

6 Claims, 10 Drawing Sheets

METHOD AND APPARATUS FOR GENERATING TIME-DIVISION MULTIPLEXED ENCODED TRANSMISSION SIGNAL

CROSS-REFERENCE TO RELATED APPLICATION

This application is based on and claims priority under 35 USC 119 from Japanese Patent Application No. 2009-038877 filed on Feb. 23, 2009 the disclosure of which is incorporated by reference herein.

BACKGROUND

1. Technical Field

The present invention relates to a method of generating a time-division multiplexed encoded transmission signal that is used in a communication system where an optical time-division multiplexing method and an optical code-division multiplexing method are used together, and an apparatus for realizing the same.

2. Related Art

In recent years, with the development of the Internet, communication demands have rapidly increased. For this reason, a communication capacity has increased. As an example of a method for increasing the communication capacity, optical multiplexing technologies for collectively transmitting optical pulse signals corresponding to plural channels through one optical fiber transmission path have attracted attention.

As the optical multiplexing technologies, an optical time-division multiplexing (OFDM) scheme, a wavelength-division multiplexing (WDM) scheme, and an optical code division multiplexing (OCDM) scheme have been actively studied.

According to the optical multiplexing technologies, optical pulse signals corresponding to plural channels may be collectively transmitted through one optical fiber transmission path. Accordingly, the communication capacity may be increased while the existing communication network is maintained as it is. If these optical multiplexing technologies are combined, the communication capacity may be further increased.

Accordingly, a communication system where the OTDM scheme and the OCDM scheme are used together is suggested (for example, refer to "Study Of OTDM Channel Identifying Technique Using FBG Type Optical Encoder" in Ref. 1 Proceedings of the 2007 Communications Society Conference of the Institute of Electronics, Information and Communication Engineers, B-10-60).

In the communication system where the OTDM scheme and the OCDM scheme are used together, in order to efficiently realize the OTDM scheme, the time delay amount of an encoded transmission signal of each channel needs to be adjusted, such that the encoded signals of the individual channels are arranged at an equivalent interval on a time axis. In terms of effective utilization of communication resources, a time slot that is allocated to each channel may be minimized.

If the time slot that is allocated to each channel is minimally set, adjacent channels may overlap each other due to a change in a communication state. If the channels overlap, crosstalk may be generated between the adjacent channels. If the time slot is secured to be excessively wide, the time slot includes an unnecessary time zone, although the adjacent channels do not overlap each other. Accordingly, this becomes an obstacle when communication resources are effectively used and communication efficiency is improved.

In order to minimize the time slot and prevent the crosstalk from being generated between the adjacent channels, such that the encoded transmission signals of the individual channels may be dynamically adjusted so that they are arranged at an equivalent interval on the time axis. The optimal positions of the encoded transmission signals of the individual channels on the time axis are momentarily changed according to a communication state.

Accordingly, in the communication system where the OTDM scheme and the OCDM scheme are used together, the time delay added to the encoded transmission signals of the individual channels need to be flexibly changed according to the momentarily changed communication state, such that the encoded transmission signals of the individual channels are arranged at the equivalent interval on the time axis.

However, in the communication system where the OTDM scheme and the OCDM scheme are used together, a method that adjusts the encoded transmission signals of the individual channels to be arranged at the equivalent interval on the time axis has not been proposed.

SUMMARY

Accordingly, the present invention provides a method that adjusts encoded transmission signals of individual channels to be arranged at an equivalent interval on a time axis, and an apparatus for realizing the same.

An OTDM/OCDM transmission signal generating method according to an aspect of the invention is a method of generating time-division multiplexed encoded transmission signals, including: encoding optical pulse signals for each of a plural multiplexed channels whose bit rate is F bit/s and generating a transmission signal for each channel; performing time division multiplexing on first and second transmission signals selected from the transmission signals of the plural multiplexed channels and generating a 2-channel multiplexed signal; modulating the multiplexed signal with a modulation signal having a frequency of $(F-\Delta f)$ Hz, where $\Delta f$ is defined as a real number satisfying the condition $\Delta f > 0$ and F is defined as a real number satisfying the condition $F > \Delta f$; detecting a strength of a $\Delta f$ Hz frequency component of the multiplexed signal modulated by the modulation signal; changing a time delay amount of the second transmission signal with respect to the first transmission signal, and determining a time delay amount at which a strength of the $\Delta f$ Hz frequency component is minimized; and applying a time delay to the transmission signal of each of the multiplexed channels on the basis of the determined time delay amount, and adjusting the transmission signals of the individual channels such that they are arranged at equidistant intervals on a time axis.

The OTDM/OCDM transmission signal generating method according to the aspect of the invention is realized by an OTDM/OCDM transmission signal generating apparatus according to another aspect of the invention described below.

The OTDM/OCDM transmission signal generating apparatus according to another aspect of the invention is an apparatus for generating time-division multiplexed encoded transmission signals, including: encoded transmission signal generators that encode optical pulse signals whose bit rate is F bit/s and output generated transmission signals, the number of the encoded transmission signal generators corresponding to the number of a plural multiplexed channels; an optical multiplexer that performs time division multiplexing on first and second transmission signals output from two encoded transmission signal generators selected from the encoded transmission signal generators, and generates a 2-channel multiplexed signal; a spectrum analyzer that modulates the multiplex signal by a modulation signal having a frequency (F−Δf) Hz, where Δf is defined as a real number satisfying the condition Δf>0 and F is defined as a real number satisfying the condition F>Δf, and detects a strength of a Δf Hz frequency component in the multiplexed signal modulated by the modulation signal; and a optical delay amount controller that changes the time delay amount of the second transmission signal with respect to the first transmission signal, determines the time delay amount Δt which the strength of the Δf MHz frequency component is minimized, sets the time delay amount of the transmission signal of each of the multiplexed channels on the basis of the determined time delay amount Δt, and adjusts the transmission signals of the individual channels such that they are arranged at equidistant intervals on a time axis.

If the OTDM/OCDM transmission signal generating method according to the aspect of the invention is constructed as a method of generating 2-channel OTDM/OCDM transmission signals, the OTDM/OCDM transmission signal generating method becomes an OTDM/OCDM transmission signal generating method described below.

The OTDM/OCDM transmission signal generating method according to another aspect of the invention is a method of generating time-division multiplexed encoded transmission signals, including: encoding an optical pulse signal of a first channel whose bit rate is F bit/s and generating and outputting a first transmission signal; encoding an optical pulse signal of a second channel whose bit rate is F bit/s and generating and outputting a second transmission signal; inputting the second transmission signal and applying a time delay to the second transmission signal; performing time division multiplexing on the first transmission signal and the second transmission signal to which the time delay has been applied, and generating a 2-channel multiplexed signal; modulating the multiplexed signal with a modulation signal having a frequency (F−Δf) Hz, where Δf is defined as a real number satisfying the condition Δf>0 and F is defined as a real number satisfying the condition F>Δf, and generating a modulated multiplexed signal; converting the modulated multiplexed signal into an modulated multiplexed electrical signal and outputting the modulated multiplexed electrical signal; changing the time delay amount applied to the second transmission signal, and determining a time delay amount at which the strength of Δf Hz frequency component of the modulated multiplexed electrical signal is minimized; and setting the time delay of the second encoded transmission signal on the basis of the determined time delay amount, and adjusting the first and second encoded transmission signals such that they are arranged at equidistant intervals on a time axis.

The OTDM/OCDM transmission signal generating method that generates the 2-channel OTDM/OCDM transmission signals is realized by an OTDM/OCDM transmission signal generating apparatus described below.

The OTDM/OCDM transmission signal generating apparatus according to another aspect of the invention is an apparatus for generating time-division multiplexed encoded transmission signals, including: first and second transmission signal generators that encode optical pulse signals whose bit rate is F bit/s, and generate and output generated transmission signals; an optical delayer disposed in the second transmission signal generator that applies a time delay to a transmission signal output from the second transmission signal generator; an optical multiplexer that performs time division multiplexing on the first transmission signal and the second transmission signal to which the time delay has been applied, and outputs a 2-channel multiplexed signal; an optical branching device that branches the multiplexed signal into a multiplexed signal for transmission and a multiplexed signal for monitoring; an optical modulator that receives the multiplex signal for monitoring, modulates the multiplexed signal for monitoring with a modulation signal whose frequency is (F−Δf) Hz, where Δf is defined as a real number satisfying the condition Δf>0 and F is defined as a real number satisfying the condition F>Δf, and generates a modulated multiplexed signal; a photoelectric converter that receives the modulated multiplexed signal, converts the modulated multiplexed signal into a modulated multiplexed electrical signal, and outputs the modulated multiplexed electrical signal; a spectrum analyzer that detects the strength of a Δf Hz frequency component of the modulated multiplex electrical signal; and an optical delay amount controller that sets the optical delayer to the time delay amount to apply a time delay at which the strength of a Δf Hz frequency component is minimized to the second transmission signal, and adjusts the transmission signals of the multiplexed channels such that they are arranged at equidistant intervals on a time axis.

If the OTDM/OCDM transmission signal generating method according to the invention is constructed as a method of generating $2^N$-channel OTDM/OCDM transmission signals, the OTDM/OCDM transmission signal generating method becomes an OTDM/OCDM transmission signal generating method described below.

The OTDM/OCDM transmission signal generating method according to another aspect of the invention is a method of generating time-division multiplexed encoded transmission signals, including: encoding optical pulse signals of $2^N$ channels (N is an integer of 1 or more) whose bit rate is F bit/s, and generating transmission signals; inputting a second transmission signal corresponding to one transmission signal of first and second transmission signals selected from the transmission signals of the $2^N$ channels, and applying a time delay to the second transmission signal to generate a delayed second transmission signal; performing time division multiplexing on the first transmission signal and the delayed second transmission signal and generating 2-channel multiplexed signal; modulating the multiplexed signal by a modulation signal having a frequency (F−Δf) Hz, when Δf is defined as a real number satisfying the condition Δf>0 and F is defined as a real number satisfying the condition F>Δf, and generating a modulated multiplexed signal; converting the modulated multiplexed signal into a modulated multiplexed electrical signal and outputting the modulated multiplexed electrical signal; changing the time delay amount applied to the second transmission signal, and determining the time delay amount Δt which the strength of a Δf Hz frequency component of the modulated multiplexed electrical signal is minimized; and sequentially adding the time delay amounts $(1/2^{N-1})\Delta t$, $(2/2^{N-1})\Delta t$, $(3/2^{N-1})\Delta t$, ..., and $\{(2^N-1)/2^{N-1}\}\Delta t$ which are integral multiples of the time delay amount $\Delta t/2^{N-1}$ determined on the basis of the determined time delay amount Δt, to the transmission signals of the second to $2^N$-th channels, generating delayed second to $2^N$-th transmission signals, and adjusting the transmission signals of the individual channels such that they are arranged at equidistant intervals on a time axis; and performing time division multiplexing on the transmission signal of the first channel and the delayed second to $2^N$-th transmission signals to which the time delay amounts are respectively added, and generating a multiplexed transmission signal.

The OTDM/OCDM transmission signal generating method that generates the $2^N$-channel OTDM/OCDM transmission signals is realized by an OTDM/OCDM transmission signal generating apparatus described below.

The OTDM/OCDM transmission signal generating apparatus according to another aspect of the invention is an apparatus for generating time-division multiplexed encoded transmission signals, including: first to $2^N$-th (N is an integer of 1 or more) encoded transmission signal generators that encode optical pulse signals whose bit rate is F bit/s, and output generated transmission signals; optical delayers that are disposed in the second to $2^N$-th encoded transmission signal generators, respectively, to apply time delays to the transmission signals output from the second to $2^N$-th encoded transmission signal generators; an optical multiplexer that performs time division multiplexing on the transmission signals output from the first to $2^N$-th encoded transmission signal generators and generates a multiplexed transmission signal; a sub-optical multiplexer that performs time division multiplexing on first and second transmission signals output from first and second encoded transmission signal generators selected from the first to $2^N$-th encoded transmission signal generators and generates a 2-channel multiplexed signal; an optical modulator that modulates the multiplexed signal by a modulation signal whose frequency is (F−Δf) Hz, when Δf is defined as a real number satisfying the condition Δf>0 and F is defined as a real number satisfying the condition F>Δf, and generates a modulated multiplexed signal; a spectrum analyzer that detects a strength of a Δf Hz frequency component of a multiplexed signal, which changes according to a change in the time delay amount applied to the second encoded transmission signal; and an optical delay amount controller that changes the time delay amount applied to the second encoded transmission signal, determines a time delay amount Δt which the strength of a Δf Hz frequency component of a modulated multiplexed electrical signal is minimized, sequentially sets the time delay amounts $(1/2^{N-1})\Delta t$, $(2/2^{N-1})\Delta t$, $(3/2^{N-1})\Delta t$, ..., and $\{(2^N-1)/2^{N-1}\}\Delta t$ which are integral multiples of the time delay amount $\Delta t/2^{N-1}$ determined on the basis of the determined time delay amount Δt, to the optical delayers of the second to $2^N$-th encoded transmission signal generators, and adjusts the transmission signals output from the first to $2^N$-th encoded transmission signal generators such that they are arranged at equidistant intervals on a time axis.

BRIEF DESCRIPTION OF THE DRAWINGS

Exemplary embodiments of the present invention will be described in detail based on the following figures, wherein.

DETAILED DESCRIPTION

Figure 1:
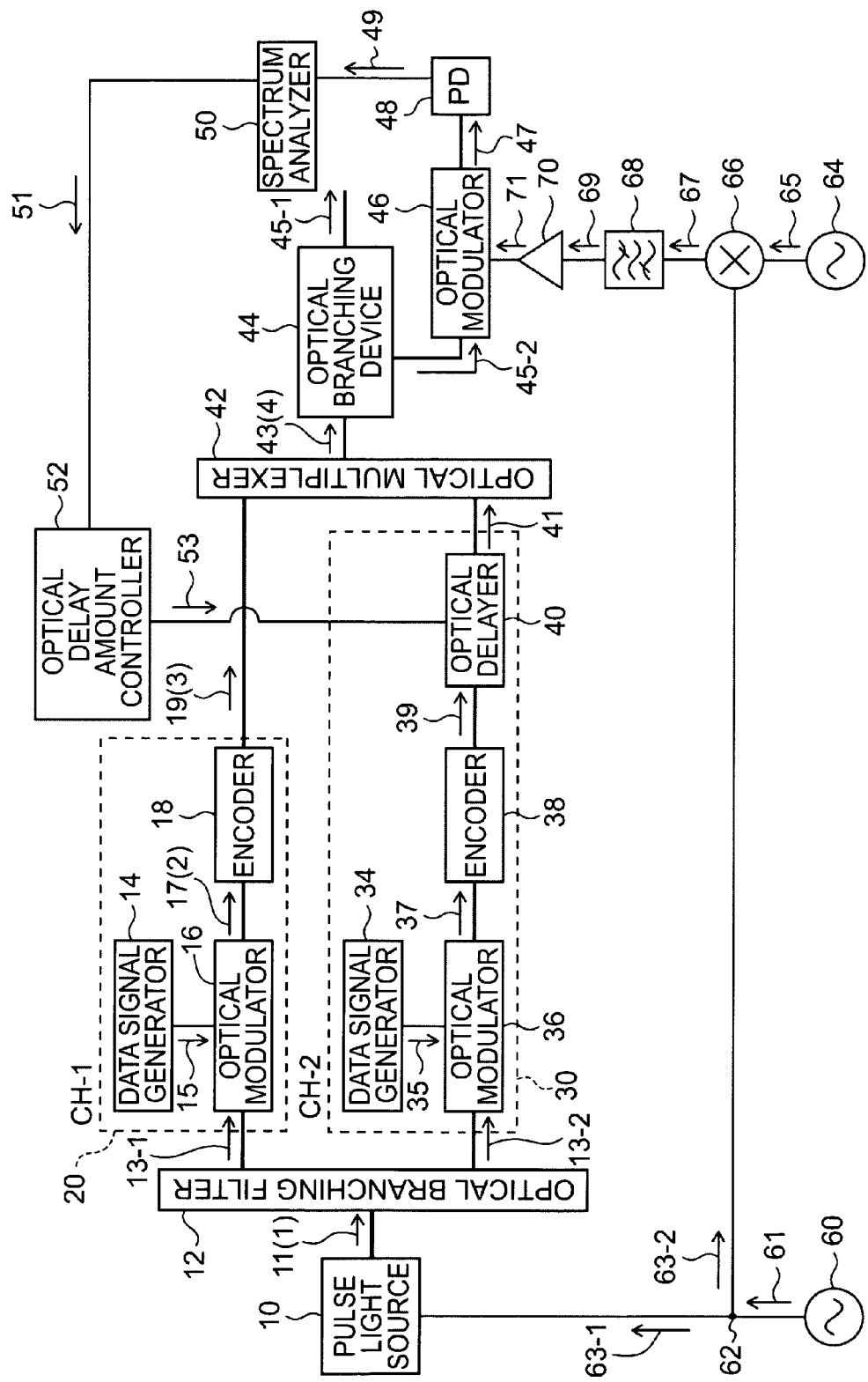
FIG. 1 is a block diagram illustrating the schematic configuration of a 2-channel OTDM/OCDM transmission signal generating apparatus according to an exemplary embodiment of the invention.

As a most basic form of time-division multiplexing communication, the case where transmission signals of two channels are time-division multiplexed and transmitted is assumed. That is, the case to be considered is the one in which an optical pulse signal whose bit rate is F bit/s is encoded and converted into an encoded transmission signal and transmission signals of two channels are time-division multiplexed and transmitted. In this case, if encoded transmission signals of first and second channels are arranged at an equivalent interval on a time axis, a 2F Hz frequency component of a generated time-division multiplexed encoded signal (hereinafter, simply referred to as OTDM/OCDM signal) is maximized.

When the encoded transmission signals of the first and second channels are time-division multiplexed, a time delay Δt is applied to the encoded transmission signal of the second channel before multiplexing. A 2F Hz frequency component of an OTDM/OCDM signal is maximized by adjusting the time delay amount Δt. As a result, a state where time slots are equally allocated to the first and second channels is obtained.

That is, the time delay amount Δt in which the 2F Hz frequency component of the OTDM/OCDM signal is maximized is added to the encoded transmission signal of the second channel and the encoded transmission signal is time-division multiplexed. The time slots may be equally allocated to the first and second channels, and the time slots allocated to the individual channels may be set to the minimum widths.

Even when the number of time-division multiplexed channels is $2^N$ (N is an integer of 1 or more), encoded transmission signals of 2 channels that are selected from the $2^N$ channels are multiplexed and 2-channel OTDM/OCDM signals (hereinafter, simply referred to as 2-OTDM/OCDM signals) are generated. As described above, the time delay amount ΔT where the time slots are equally allocated to the 2 selected channels is calculated. Thereby, time delays of $(1/2^{N-1})\Delta t$, $(2/2^{N-1})\Delta t$, $(3/2^{N-1})\Delta t$, $\{(2^N-1)/2^{N-1}\}\Delta t$, which are equal to the integral multiple of the time delay amount $\Delta t/2^{N-1}$, are sequentially applied to the encoded transmission signals of the second and following channels, and the encoded transmission signal of the first channel becoming a reference is time-division multiplexed. As a result, the encoded transmission signals of the first to $2^N$-th channels are arranged at an equivalent interval on a time axis.

However, it is very difficult to observe the component of the OTDM/OCDM signal where the frequency is 2F Hz, because a value of F is a large value reaching up to the range of GHz.

Therefore, the inventors of the invention have modulated 2-OTDM/OCDM signals by modulation signals having frequency (F−Δf) Hz, and have measured the strength of Δf Hz frequency component of the generated modulated OTDM/OCDM signals. As a result, the inventors noticed that the 2F Hz frequency component of the OTDM/OCDM signal may be indirectly measured. In this case, Δf is defined as a real number satisfying the condition Δf>0 and F is defined as a real number satisfying the condition F>Δf.

An optical pulse signal whose bit rate is F bit/s is encoded to generate an encoded signal, and a component where a frequency is F Hz is included in an OTDM/OCDM signal obtained by performing time division multiplexing on the encoded signal. The OTDM/OCDM signal is modulated by a modulation signal having frequency (F−Δf) Hz, and a Δf Hz frequency component is included in the generated modulated OTDM/OCDM signal.

The strength of the Δf Hz frequency component and the strength of the 2F Hz frequency component of the OTDM/OCDM signal are related in such a way that, if the strength of one of the two components increases, the strength of the other decreases. That is, in order to adjust the above-described time delay amount Δt, the strength of the component of the Δf Hz frequency component of the modulated OTDM/OCDM signal may be observed, instead of observing the strength of the 2F Hz frequency component of the OTDM/OCDM signal.

According to an OTDM/OCDM transmission signal generating method according to an aspect of the invention, a 2-OTDM/OCDM signal is modulated by a modulation signal having a frequency (F−Δf) Hz, and the strength of a Δf Hz frequency signal component that is included in the 2-OTDM/OCDM signal modulated by the modulation signal is detected.

In this case, in a frequency spectrum of the 2-OTDM/OCDM signal, an F Hz frequency component is a main component. This is represented as $A \sin 2\pi Ft$, if the magnitude of amplitude is defined as A and a time variable is defined as t. A modulation signal having a frequency (F−Δf) Hz is represented as $B \sin 2\pi(F-\Delta f)t$, if the amplitude of the modulation signal is defined as B.

If the 2-OTDM/OCDM signal is modulated by the modulation signal having frequency (F−Δf) Hz, as represented by the following Equation (1), a signal that is given by a sum of a signal component where a frequency is (2F−Δt) Hz and a signal component where a frequency is Δf Hz is obtained.

$$A \sin 2\pi Ft \times B \sin 2\pi(F-\Delta f)t = (AB/2)\cos 2\pi\Delta ft - (AB/2)\cos 2\pi(2F-\Delta f)t \quad (1)$$

When the time delay amount is determined, the time delay amount of the second encoded transmission signal (encoded transmission signal of the second channel) with respect to the first encoded transmission signal (encoded transmission signal of the first channel) is changed, the strength of a Δf Hz signal component that is included in the 2-OTDM/OCDM signal modulated by the modulation signal having the frequency (F−Δf) Hz is detected, and the time delay amount Δt where the strength of the Δf Hz signal component is minimized is determined.

Since the frequencies of the first and second encoded transmission signals are F Hz, if the first and second encoded transmission signals are arranged at an equivalent interval on the time axis, the 2F Hz frequency component included in the 2-OTDM/OCDM signal is maximized, and the F Hz frequency component is minimized.

When the F Hz frequency component is minimized, in Equation (1), a value of A that is an amplitude coefficient of $A \sin 2\pi Ft$ is minimized. In this case, the magnitude of an amplitude coefficient (AB/2) of (AB/2)cos $2\pi\Delta ft$ that is a first term of a right side of Equation (1) is also minimized, when the value of A is minimized.

Accordingly, the first encoded transmission signal and the second encoded transmission signal are arranged at an equivalent interval on the time axis. In the case where the time delay amount Δt is added to the second encoded transmission signal such that a 2F Hz frequency component of the 2-OTDM/OCDM signal is maximized, if the amplitude coefficient (AB/2) of the first term of the right side that is given by (AB/2)cos $2\pi\Delta ft$ of Equation (1) has a minimum value, the signal strength of the Δf Hz frequency component is minimized.

To determine the time delay amount, the time delay amount of the second encoded transmission signal with respect to the first encoded transmission signal is changed so as to determine the time delay amount in which the strength of the Δf Hz signal component is minimized. In a method that generates OTDM/OCDM transmission signals of $2^N$ channels, on the basis of the determined time delay amount Δt, time delay amounts $(1/2^{N-1})\Delta t$, $(2/2^{N-1})\Delta t$, $(3/2^{N-1})\Delta t$, $\{(2^N-1)/2^{N-1}\}\Delta t$ that are obtained by multiplying the time delay amount $\Delta t/2^{N-1}$ by integers are sequentially applied to the second to $2^N$-th encoded transmission signals, and delayed second to $2^N$-th encoded transmission signals are generated.

As described above, according to the OTDM/OCDM transmission signal generating method, 2-OTDM/OCDM signals that are generated by multiplexing encoded transmission signals of 2 channels that are selected from encoded transmission signals of the number of multiplexed channels are modulated by modulation signals having a frequency (F−Δf) Hz, and the time delay amount Δt in which the strength of Δf Hz frequency component of the modulated OTDM/OCDM signals is minimized, is determined. On the basis of the determined time delay amount Δt, time delay is applied to an encoded transmission signal of each of the multiplexed channels and the encoded transmission signal is time-division multiplexed. As a result, the encoded transmission signals of the individual channels are arranged at an equivalent interval on the time axis.

If the ΔHz component of the modulated OTDM/OCDM signal with respect to the time delay amount Δt applied to the second encoded transmission signal is monitored, the time delay is applied to an encoded transmission signal of each of the multiplexed channels on the basis of the time delay amount Δt applying the minimum value of the Δf Hz component, and the encoded transmission signal is time-division multiplexed, the encoded transmission signals of the individual channels are always arranged at an equivalent interval on the time axis.

In the case of an OTDM/OCDM transmission signal generating apparatus that generates OTDM/OCDM transmission signals of $2^N$ channels, if first and second encoded transmission signals are allocated as encoded transmission signals of 2 channels that are selected from encoded transmission signals of the number of multiplexed channels, the first and second encoded transmission signals are always arranged at an equivalent interval on the time axis.

Hereinafter, an exemplary embodiment of the invention will be described with reference to the accompanying drawings. The individual drawings that are provided to describe a form of the OTDM/OCDM transmission signal generating apparatus and a form of portions constituting the OTDM/OCDM transmission signal generating apparatus illustrate one configuration according to the invention. Accordingly, the arrangement of the individual constituents is schematically illustrated to a degree to which the invention may be understood, and the invention is not limited to the examples illustrated in the drawings. In the individual drawings, the same constituents are denoted by the same reference numerals, and the redundancy is omitted. In the schematic block configuration drawings illustrated below, a path of an optical signal, such as an optical fiber, is illustrated by a thick line, and a path of an electric signal is illustrated by a thin line.

<OTDM/OCDM Transmission Signal Generating Apparatus>

In order to describe the basic configuration of the OTDM/OCDM transmission signal generating apparatus according to the invention, first, an exemplary embodiment of the OTDM/OCDM transmission signal generating apparatus that generates OTDM/OCDM transmission signals of 2 channels will be described.

The configuration and operation of the 2-channel OTDM/OCDM transmission signal generating apparatus according to the exemplary embodiment of the invention will be described with reference to FIG. 1. FIG. 1 is a block diagram illustrating the schematic configuration of the 2-channel OTDM/OCDM transmission signal generating apparatus according to the exemplary embodiment of the invention.

The 2-channel OTDM/OCDM transmission signal generating apparatus according to the exemplary embodiment of the invention includes a first encoded transmission signal generator 20, a second encoded transmission signal generator 30, an optical delayer 40, an optical multiplexer 42, an optical branching device 44, an optical modulator 46, a photoelectric converter 48, a spectrum analyzer 50, and an optical delay amount controller 52. Hereinafter, the configuration and operation of the OTDM/OCDM transmission signal generating apparatus according to the exemplary embodiment of the invention will be described in detail, including the constituents and other elements needed to operate the constituents.

A basic clock signal 61 having F Hz, which is a basic operation frequency, is output from an oscillator 60 to the 2-channel OTDM/OCDM transmission signal generating apparatus. The basic clock signal 61 is branched into basic clock signals 63-1 and 63-2 by an electric branching device 62. The basic clock signal 63-1 is supplied to a pulse light source 10, and an optical pulse train 11 where a frequency is F Hz is repetitively output from the pulse light source 10.

Meanwhile, the basic clock signal 63-2 is supplied to a mixer 66 and mixed with a sine-wave signal 65 that is output from the oscillator 64 and has a frequency of $\Delta f$ Hz, and a source modulation signal 67 that is given by the above Equation (1) is generated. Only a (F−$\Delta f$) Hz frequency component of the source modulation signal 67 is filtered by a band-pass filter 68, and the source modulation signal 67 is used as a modulation signal of the optical modulator 46 to be described in detail below.

The optical pulse train 11 that is output from the pulse light source 10 is input to an optical branching filter 12, and is branched into a first optical pulse train 13-1 and a second optical pulse train 13-2 and output. The first optical pulse train 13-1 is input to the first encoded transmission signal generator 20.

The first encoded transmission signal generator 20 includes a data signal generator 14, an optical modulator 16, and an encoder 18. For convenience of explanation, it is assumed that the first channel is allocated to the first encoded transmission signal generator 20 and the second channel is allocated to the second encoded transmission signal generator 30 to be described in detail below.

In the description below, the first encoded transmission signal and the second encoded transmission signal may both be simply called encoded transmission signals provided that it does not cause confusion.

The data signal generator 14 outputs a binary digital electric signal 15 that is a transmission data signal of the first channel. The optical modulator 16 is modulated by the electric signal 15, and the first optical pulse train 13-1 is converted into a first optical pulse signal 17 and is output from the optical modulator 16. The first optical pulse signal 17 is encoded by a code that is allocated to the first channel by the encoder 18, and the first encoded transmission signal 19 is generated and output. That is, the first encoded transmission signal generator 20 encodes the optical pulse signal 17 of the first channel whose bit rate is F bit/s, and generates the first encoded transmission signal 19. In FIG. 1, since the first channel is allocated, the first encoded transmission signal generator 20 is displayed as CH-1

The second encoded transmission signal generator 30 includes a data signal generator 34, an optical modulator 34, an encoder 38, and an optical delayer 40.

The data signal generator 34 outputs the binary digital electric signal 35 that is the transmission data signal of the second channel. The optical modulator 36 is modulated by the electric signal 35, and the second optical pulse train 13-2 is converted into the second optical pulse signal 37 and output from the optical modulator 36. The second optical pulse signal 37 is encoded by a code that is allocated to the second channel by the encoder 38, and the second encoded transmission signal 39 is generated and output. The second encoded transmission signal 39 is input to the optical delayer 40, adds the time delay amount $\Delta t$ needed to arrange the encoded transmission signals of the first and second channels at an equivalent interval on the time axis, and generates the second encoded transmission signal 41.

The second encoded transmission signal generator 30 encodes the optical pulse signal 37 of the second channel whose bit rate is F bit/s, and generates the second encoded transmission signal 39. The second encoded transmission signal 41 is output from the optical delayer 40 that is included in the second encoded transmission signal generator 30. That is, the second encoded transmission signal 41 is output from the second encoded transmission signal generator 30. In FIG. 1, since the second channel is allocated, the second encoded transmission signal generator 30 is displayed as CH-2.

The first encoded transmission signal 19 and the second encoded transmission signal 41 are input to the optical multiplexer 42 and a 2-OTDM/OCDM signal 43 is output. The 2-OTDM/OCDM signal 43 is input to the optical branching device 44, branched into a 2-OTDM/OCDM signal 45-1 and an OTDM/OCDM signal 45-2 for monitoring, and output. The 2-OTDM/OCDM signal 45-1 is used as a signal that is transmitted as the 2-OTDM/OCDM transmission signal.

Meanwhile, the OTDM/OCDM signal 45-2 for monitoring is input to the optical modulator 46 and modulated by a modulation signal 71 having a frequency (F−$\Delta f$) Hz, and a modulated OTDM/OCDM signal 47 is generated and output. As the modulation signal that modulates the optical modulator 46, a modulation signal 69 that is output from a band-pass filter 68 and has a frequency of (F−$\Delta f$) Hz may be used. However, the strength of the modulation signal 69 may not be sufficient according to the used optical modulator 46. Accordingly, the modulation signal 71 that is amplified by the amplifier 70 and obtained may be used as the modulation signal.

The optical branching device 44 may be an optical branching device of a type that taps a portion of the 2-OTDM/OCDM signal 43 and extracts the OTDM/OCDM signal 45-2 for monitoring or may be a type of an optical switching element that switches the 2-OTDM/OCDM signal 43 into an 2-OTDM/OCDM signal 45-1 and an OTDM/OCDM signal 45-2 for monitoring and outputs the signals.

When the optical branching device of the type that taps the portion of the signal and extracts the signal is used, the 2-OTDM/OCDM signal 45-1 is always output from the OTDM/OCDM transmission signal generating apparatus according to the exemplary embodiment of the invention. When the type of an optical switching element is used, during the time in which a Δf signal component is extracted, a time delay amount is determined, and an optical delay amount is set, the 2-OTDM/OCDM signal 45-1 is not output. The optical branching device of the type tapping the portion of the signal and extracting the signal or the type of an optical switching element is used according to design criteria.

The modulated OTDM/OCDM signal 47 is input to the photoelectric converter 48, converted into the electrical modulation OTDM/OCDM signal 49, and output. The electrical modulation OTDM/OCDM signal 49 is input to the spectrum analyzer 50, and the strength of the Δf Hz signal frequency component in the electrical modulation OTDM/OCDM signal 49 is detected. The strength of the Δf Hz signal component is output from the spectrum analyzer 50. Accordingly, the delay time Δt for which the strength of the Δf Hz signal component is minimized may be found as the delay time Δt provided to the optical delayer 40 is continuously changed.

If the optical delay amount controller 52 instructs the optical delayer 40 using an instruction signal 53 to provide the delay time Δt to the optical delayer 40, the delay time Δt that enables the encoded transmission signals of the first and second channels to be arranged at an equivalent interval on the time axis is added to the second encoded transmission signal 39.

The Δf signal component extracting step, the time delay amount determining step, and the optical delay amount setting step that are respectively executed mainly using the optical modulator 46, the spectrum analyzer 50, and the optical delay amount controller 52 maybe manually executed. If the strength of the Δf Hz signal component is visually observed by the spectrum analyzer 50 while the delay time Δt provided to the optical delayer 40 is continuously changed, in order to find the delay time Δt for which the strength of the Δf Hz signal component is minimized. If the delay time Δt is manually provided to the optical modulator 40, the object is achieved.

The Δf signal component extracting step, the time delay amount determining step, and the optical delay amount setting step may be automated. In FIG. 1, a designation signal 51 that designates the delay time Δt for which the strength of the Δf Hz signal component is minimized is output from the spectrum analyzer 50, and the optical delay amount controller 52 instructs the optical delayer 40 using the instruction signal 53 to provide the delay time Δt to the optical delayer 40 on the basis of the designation signal 51. The automation may be appropriately executed by those skilled in the art using a method, such as known programming, on the basis of the above description.

Figure 2:
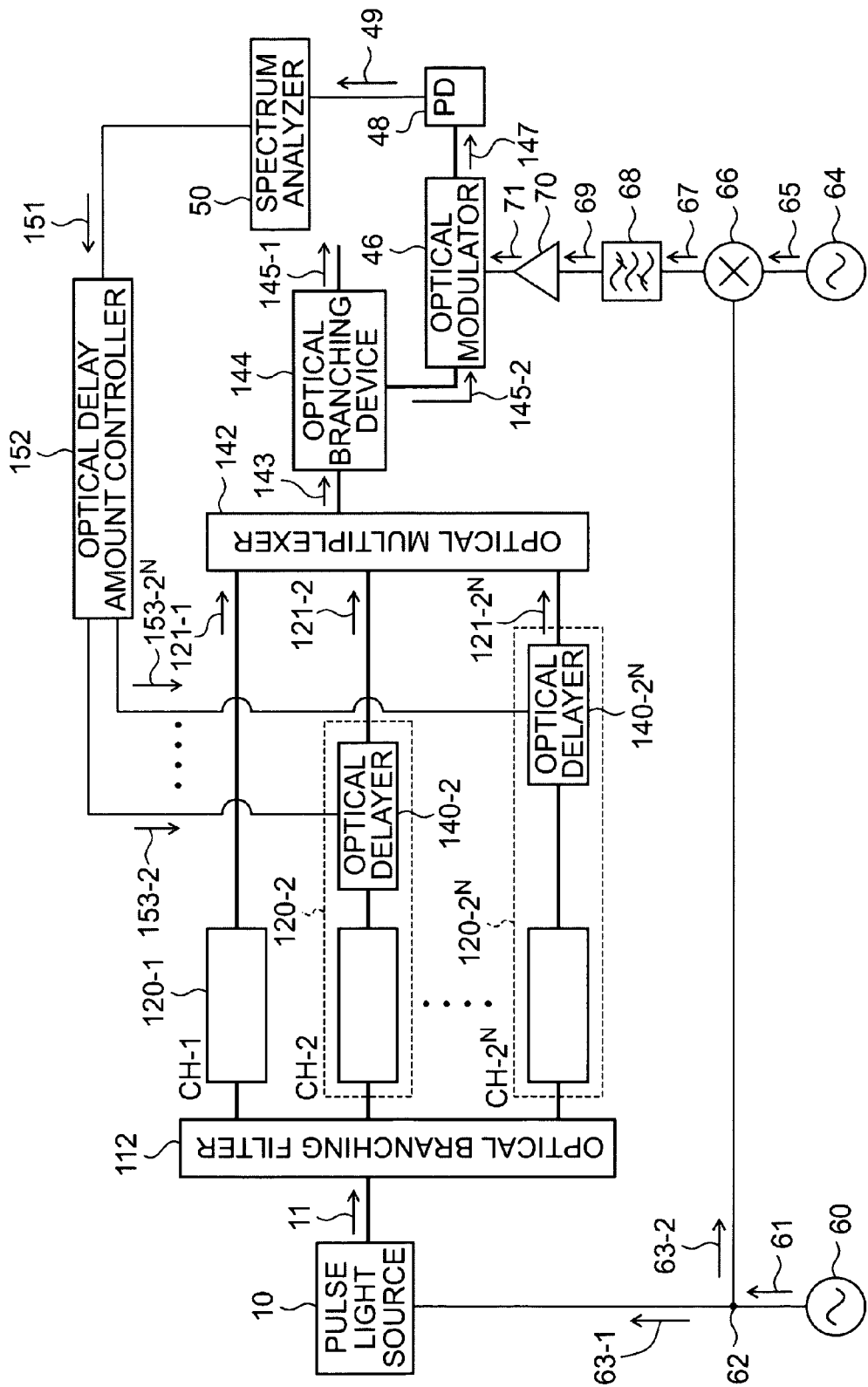
FIG. 2 is a block diagram illustrating the schematic configuration of a $2^N$-channel OTDM/OCDM transmission signal generating apparatus according to an exemplary embodiment of the invention.

Next, an exemplary embodiment of the OTDM/OCDM transmission signal generating apparatus that generates the $2^N$-channel OTDM/OCDM transmission signals will be described with reference to FIGS. 2 and 3. FIG. 2 is a block diagram illustrating the schematic configuration of a $2^N$-channel OTDM/OCDM transmission signal generating apparatus according to an exemplary embodiment of the invention.

The $2^N$-channel OTDM/OCDM transmission signal generating apparatus illustrated in FIG. 2 is different from the 2-channel OTDM/OCDM transmission signal generating apparatus illustrated in FIG. 1 in that the $2^N$-channel OTDM/OCDM transmission signal generating apparatus does not include only the two encoded transmission signal generators, but includes a first encoded transmission signal generator 120-1, a second encoded transmission signal generator 120-2, ..., and a $2^N$-th encoded transmission signal generator 120-$2^N$, which correspond to the number allocated to $2^N$ channels. The first encoded transmission signal generator 120-1 has the same structure as the first encoded transmission signal generator 20 illustrated in FIG. 1. The second to $2^N$-th encoded transmission signal generators 120-2 to 120-$2^N$ have the same structure as the second encoded transmission signal generator 30 illustrated in FIG. 1.

The second to $2^N$-th encoded transmission signal generators include optical delayers 140-2 to 140-$2^N$, respectively. However, the invention is not limited to this configuration, and the optical delayers 140-2 to 140-$2^N$ may be integrated as the optical delayer 140.

The optical multiplexer 142 performs time division multiplexing on the first encoded transmission signal 121-1 output from the first encoded transmission signal generator 120-1 and the delayed second encoded transmission signal 121-2 to the delayed $2^N$-th encoded transmission signal 121-$2^N$ output from the second to $2^N$-th encoded transmission signal generators, and outputs the OTDM/OCDM transmission signal 143. In the description below, the delayed second encoded transmission signal 121-2 to the delayed $2^N$-th encoded transmission signal 121-$2^N$ may be simplified and may be called an encoded transmission signal provided that it does not cause confusion.

In this case, in the first encoded transmission signal 121-1 or the delayed $2^N$-th encoded transmission signal 121-$2^N$, "-" that is displayed in 121-1 or 121-$2^N$ to identify the encoded transmission signal is not a subtraction symbol that means a subtraction from 121, but it simply denotes a hyphen. Meanwhile, "-" between "N" and "1" in $\Delta t/2^{N-1}$ is a subtraction symbol, which means that 1 is subtracted from a numerical value N. Since whether the symbol is the hyphen or the subtraction symbol is apparent from an anteroposterior relationship of a sentence or Equation, the specific description is omitted.

The optical branching filter 112 and the optical multiplexer 142 illustrated in FIG. 2 that correspond to the optical branching filter 12 and the optical multiplexer 42 illustrated in FIG. 1 are configured according to the number of optical signals to be branched and multiplexed, to correspond to the increase in the number of time-division multiplexed channels. Therefore, the basic configuration is the same. Since the constituents that are denoted by the same reference numerals are the same as those of the 2-channel OTDM/OCDM transmission signal generating apparatus illustrated in FIG. 1, the redundancy in the description of the same constituents are omitted.

Even in this case, the Δf signal component extracting step, the time delay amount determining step, and the optical delay amount setting step are executed mainly using the optical modulator 46, the spectrum analyzer 50, and the optical delay amount controller 152.

The configuration of the optical multiplexer 142 will be described with reference to FIG. 3. FIG. 3 is a diagram illustrating the schematic configuration of the optical multiplexer 142 that is included in the $2^N$-channel OTDM/OCDM transmission signal generating apparatus according to the exemplary embodiment of the invention.

The optical multiplexer 142 receives a first encoded transmission signal 121-1 that is output from the first encoded transmission signal generator 120-1 and a delayed second encoded transmission signal 121-2 to a delayed $2^N$-the encoded transmission signal 121-$2^N$ that are output from the second to $2^N$-th encoded transmission signal generators 120-2 to 120-$2^N$.

In this case, it is assumed that the first encoded transmission signal generator 120-1 and the second encoded transmission signal generator 120-2 are selected as the first and second encoded transmission signal generators selected from the first to $2^N$-th encoded transmission signal generators.

The optical multiplexer 142 includes N optical couplers 142-1 to 142-N of two inputs and two outputs. Each of the optical couplers 142-1 to 142-N is coupled to the two encoded transmission signal generators among the sequentially adjacent encoded transmission signal generators. For example, the optical coupler 142-1 multiplexes the first encoded transmission signal 121-1 that is output from the first encoded transmission signal generator 120-1 and the second encoded transmission signal 121-2 that is output from the second encoded transmission signal generator 120-2 to generate 2 multiplexed OTDM/OCDM signals, and divides the 2 multiplexed OTDM/OCDM signals into two parts with the equivalent strength and outputs the divided signals.

Similar to the optical coupler 142-1, each of the optical couplers 142-2 to 142-N multiplexes the delayed encoded transmission signals that are output from the sequentially adjacent encoded transmission signal generators to generate 2 multiplexed OTDM/OCDM signals, and divides the 2 multiplexed OTDM/OCDM signals into two parts with the equivalent strength and outputs the divided signals.

Even in the rear stages of the optical couplers 142-2 to 142-N, similar to the above case, $2^N$ time-division multiplexed encoded signals ($2^N$-OTDM/OCDM signals) 143-2 where the first encoded transmission signal 121-1 to the delayed $2^N$-th encoded transmission signal 121-$2^N$ are time-division multiplexed are generated by disposing the optical couplers of two inputs and two outputs in a cascade manner. That is, the first encoded transmission signal 121-1 and the delayed second to $2^N$-th encoded transmission signals are input to the optical multiplexer 142, and the OTDM/OCDM transmission signals 143 are output.

The optical coupler 142-1 multiplexes the first encoded transmission signal 121-1 that is output from the first encoded transmission signal generator and the delayed second encoded transmission signal 121-2 that is output from the second encoded transmission signal generator 120-2 to generate 2 multiplexed OTDM/OCDM signals, and one 2-OTDM/OCDM signal 143-1 that divides the 2-multiplexed OTDM/OCDM signals into two parts having the equivalent strength and outputs the divided signals is output from the optical multiplexer 142. In FIG. 2, the 2-OTDM/OCDM signal 143-1 and the $2^N$-OTDM/OCDM signal 143-2 are collected and simplified as the OTDM/OCDM signal 143. The 2-OTDM/OCDM signal 143-1 and the $2^N$-OTDM/OCDM signal 143-2 are input to the optical branching device 144, branched into a $2^N$-OTDM/OCDM signal 145-1 and an OTDM/OCDM signal 145-2 for a monitor, and output. The $2^N$-OTDM/OCDM signal 145-1 is used as the signal that is transmitted as the $2^N$-OTDM/OCDM signal 145-1.

Figure 3:
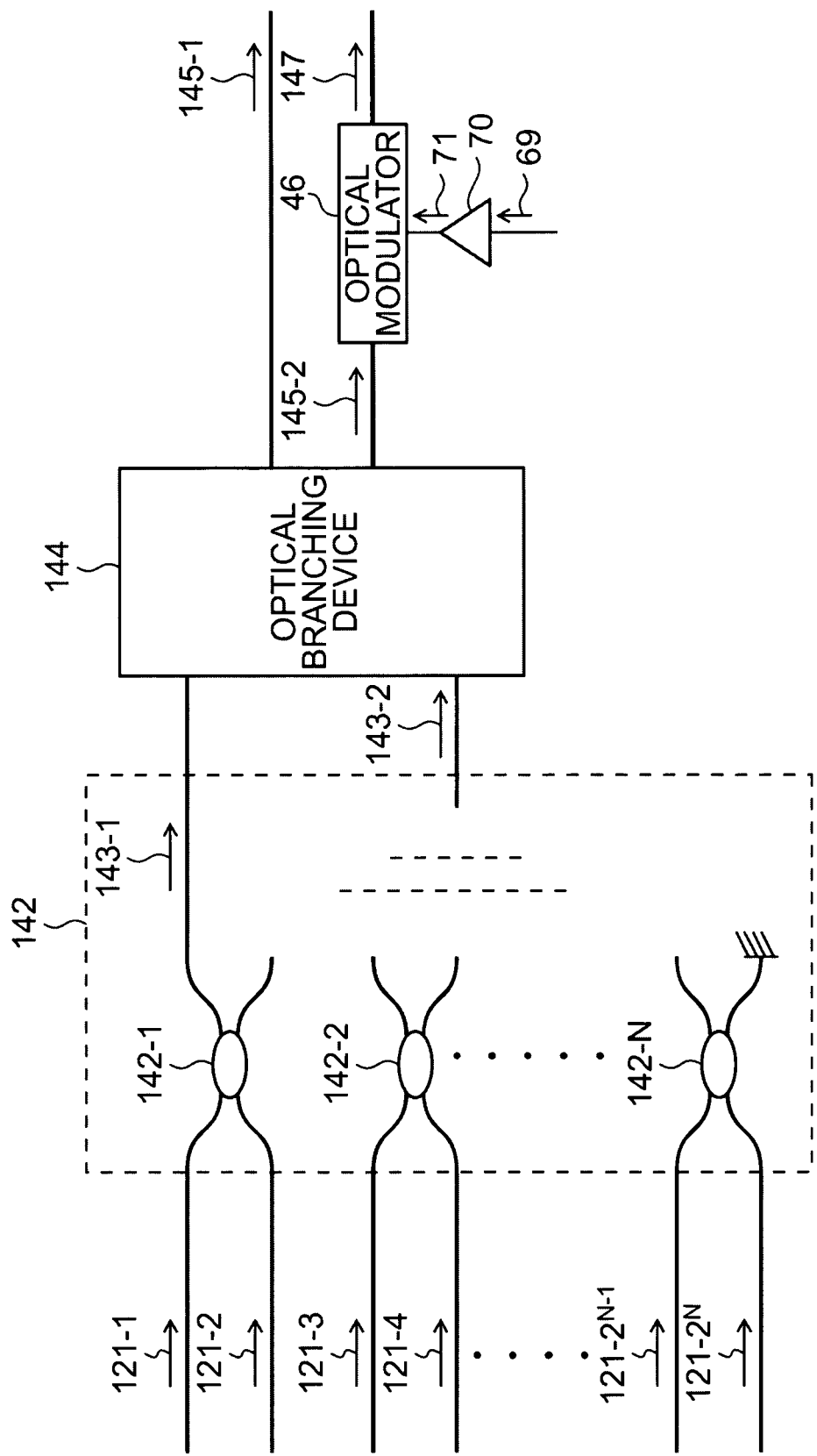
FIG. 3 is a diagram illustrating the schematic configuration of an optical multiplexer that is included in the $2^N$-channel OTDM/OCDM transmission signal generating apparatus according to the exemplary embodiment of the invention.

In FIG. 3, the optical coupler 142-1 performs a function of a sub-optical multiplexer that multiplexes the first and second encoded transmission signals output from the first and second encoded transmission signal generators selected from the first to $2^N$-th encoded transmission signal generators 120-1 to 120-$2^N$ and generates 2-OTDM/OCDM signals.

The optical modulator 46 modulates the OTDM/OCDM signal 145-2 for monitoring by a modulation signal 71 having a frequency (F−Δf) Hz and outputs a modulated OTDM/OCDM signal 147.

The spectrum analyzer 50 detects the strength of the Δf Hz signal component in the modulated OTDM/OCDM signal 147, which changes according to the change in the time delay amount that is added to the second encoded transmission signal.

The second encoded transmission signal generator 120-2 has the same configuration as the second encoded transmission signal generator 30 that is described with reference to FIG. 1. The second encoded transmission signal generator 120-2 includes an optical delayer 140-2. The optical delayer 140-2 adds the time delay to the second encoded transmission signal that corresponds to the second encoded transmission signal 39 in the second encoded transmission signal generator 30 illustrated in FIG. 1, and the delayed second encoded transmission signal is generated.

The optical delay amount controller 152 adjusts the encoded transmission signals 121-1 to 121-$2^N$, which are output from the first encoded transmission signal generator 120-1 to the $2^N$-th encoded transmission signal generator 120-$2^N$, such that they are arranged at an equivalent interval on the time axis. For this reason, the time delay amounts $(1/2^{N-1})\Delta t$, $(2/2^{N-1})\Delta t$, $(3/2^{N-1})\Delta t$, $\{(2^N-1)/2^{N-1}\}\Delta t$ equal to the integral multiple of the time delay amount $\Delta t/2^{N-1}$, which are determined on the basis of the time delay amount $\Delta t$ applied to the second encoded transmission signal where the strength of the Δf Hz signal component is minimized, are controlled to be sequentially set to the optical delayers of the second to $2^N$-th encoded transmission signal generators 120-2 to 120-$2^N$.

<Operation Principle for Determining the Time Delay Amount Δt Added to the Encoded Transmission Signal>

The operation principle for determining the time delay amount Δt added to the encoded transmission signal will be described below with reference to FIGS. 1 and 4 to 8.

As illustrated in FIG. 1, the optical pulse train 11, the first optical pulse signal 17, the first encoded transmission signal 19, and the 2-OTDM/OCDM signal 43 are output from the optical pulse light source 10, the optical modulator 16 of the first channel, the first encoded transmission signal generator 20, and the optical multiplexer, respectively.

Figure 4:
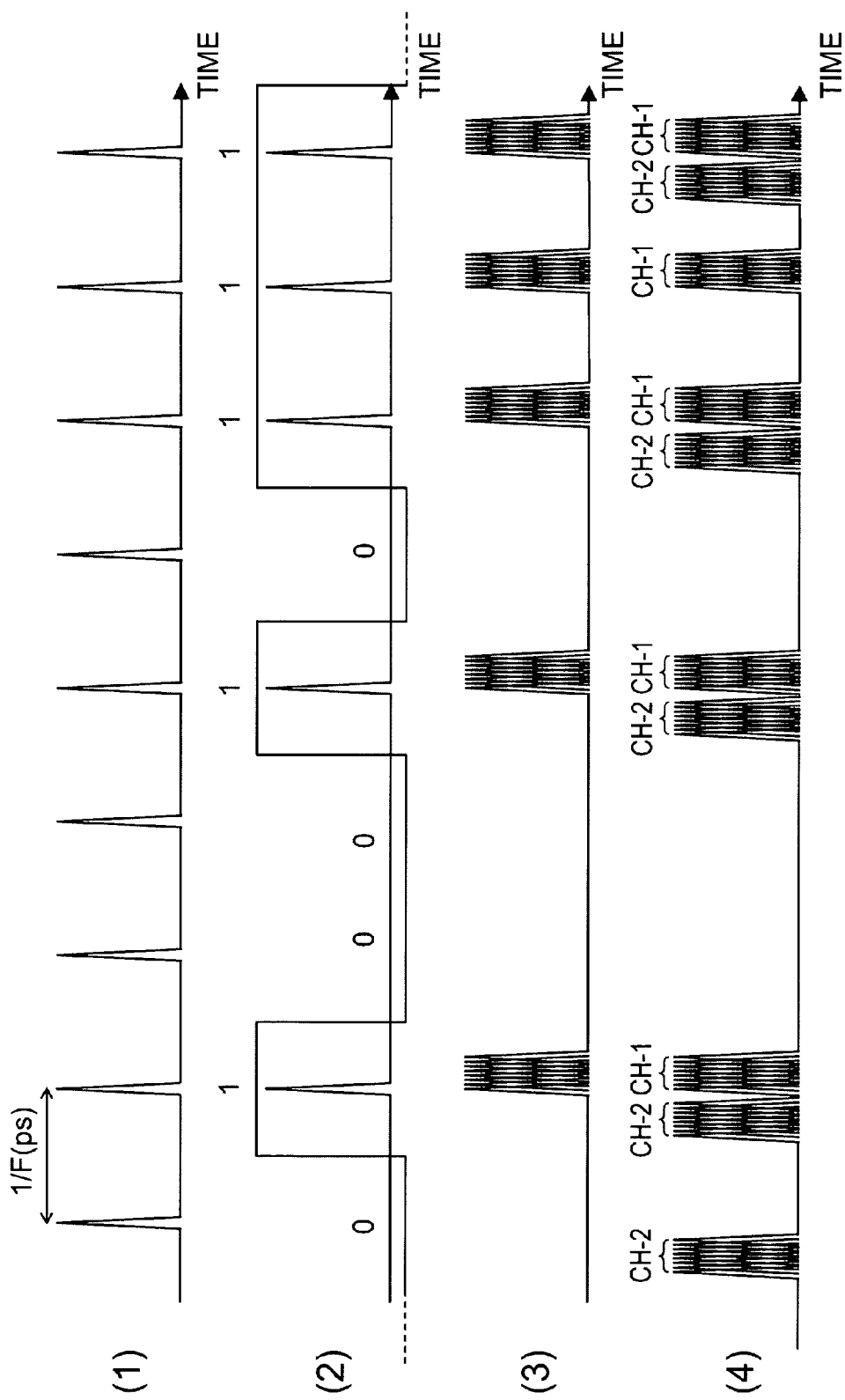
FIG. 4 illustrates time waveforms of signals that are output from an optical pulse light source, an optical modulator of a first channel, a first encoded transmission signal generator, and a second encoded transmission signal generator, respectively.

FIG. 4 illustrates time waveforms of signals that are output from the optical pulse light source 10, the optical modulator 16 of the first channel, the first encoded transmission signal generator 20, and the optical multiplexer, respectively. (1) schematically illustrates a time waveform of the optical pulse train 11, (2) schematically illustrates a time waveform of the first optical pulse signal 17, (3) schematically illustrates a time waveform of the first encoded transmission signal 19, and (4) schematically illustrates a time waveform of the 2-OTDM/OCDM signal 43. In FIG. 4, a horizontal axis represents a time axis with an arbitrary scale using scale marks and a vertical axis represents light strength with an arbitrary scale using scale marks.

In FIG. 1, parenthesized numbers (1) to (4) are added to the adjacent right sides of reference numerals (11, 17, 19, and 43) indicating the optical pulse train 11, the first optical pulse signal 17, the first encoded transmission signal 19, and the 2-OTDM/OCDM signal 43 to correspond to the time waveforms of FIG. 4.

The optical pulse train 11 is two-branched into a first optical pulse train 13-1 and a second optical pulse train 13-2 by the optical branching filter 12, and the first optical pulse train 13-1 and the second optical pulse train 13-2 are supplied to the first encoded transmission signal generator 20 and the second encoded transmission signal generator 30. The strengths of the first optical pulse train 13-1 and the second optical pulse train 13-2 are different from the strength of the optical pulse train 11, but the time waveforms of the first optical pulse train 13-1 and the second optical pulse train 13-2 are almost the same as the waveform of the optical pulse train 11. Accordingly, in the description below, the time waveforms of the first optical pulse train 13-1 and the second optical pulse train 13-2 may be described as the time waveform of the optical pulse train 11, provided that it does not cause confusion.

As illustrated in FIG. 4, (1), the optical pulse train 11 is an optical pulse train that is output from the pulse light source 10 and has a repetitive frequency of F Hz. Accordingly, the time interval of the adjacent optical pulses is 1/F sec. For example, when the optical pulse train 11 is an optical pulse train that is output from the pulse light source 10 and has a repetitive frequency of F GHz, the time interval of the adjacent optical pulses becomes 1/F ps (picosecond).

FIG. 4, (2) illustrates the first optical pulse signal 17 on the assumption that the first channel is allocated to the first encoded transmission signal generator 20 and a binary digital electric signal 15 corresponding to a transmission data signal of the first channel is (0, 1, 0, 0, 1, 0, 1, 1, 1, . . . ). In the optical modulator 16, if the optical pulse train 11 is modulated by the electric signal 15, the first optical pulse signal 17 that has the time waveform where the electric signal 15 is reflected is output from the optical modulator 16.

FIG. 4, (2) illustrates a rectangular-wave signal indicating whether the optical modulator 16 is in a transmissive state or a blocked state superposed on the optical pulse train 11. The rectangular-wave signal has the time waveform of the binary digital electric signal 15. The time width of one rectangular wave that indicates the time waveform becomes smaller than or equal to the time slot that is distributed for each channel.

As illustrated in FIG. 4, (3), the first encoded transmission signal 19 is generated by encoding performed when one optical pulse temporally spreads to plural chip pulses in the time slot allocated to the first channel. FIG. 4, (3) illustrates plural minute optical pulses (chip pulses) with respect to one optical pulse. However, in a chip pulse train, the code that is set to the encoder 18 included in the first encoded transmission signal generator 20 is reflected. FIG. 4, (3) schematically illustrates a state where the detailed structure of the code is omitted, and one optical pulse is encoded as a group of the plural chip pulses and converted.

FIG. 4, (4) illustrates a time waveform of the 2-OTDM/OCDM signal 43 where the first encoded transmission signal 19 and the second encoded transmission signal 41 are multiplexed by the optical multiplexer 42 and output. The second encoded transmission signal 41 is generated by adding the time delay to the second encoded transmission signal 39 by the optical delayer 40. The second encoded transmission signal 39 is generated by encoding the second optical pulse signal 37, which is generated by modulating the second encoded transmission signal 39 by the binary digital electric signal 35 corresponding to the transmission data signal of the second channel, by the encoder 38 included in the second encoded transmission signal generator 30.

In this case, the process in which the second optical pulse train 13-2 of the second channel is modulated by the electric signal 35 and the second optical pulse signal 37 is generated, and the second optical pulse signal 37 is encoded by the encoder 38 and the second encoded transmission signal 39 is generated is the same as the process in which the first encoded transmission signal 19 of the first channel is generated. Accordingly, the provisions of the time waveforms in the processes are omitted. In this case, on the assumption that the electric signal 35 is (1, 1, 0, 0, 1, 0, 1, 0, 1, . . . ), the component of the second encoded transmission signal 41 is illustrated in FIG. 4, (1). In FIG. 4, (4), the component of the first encoded transmission signal 19 is denoted by "CH-1" and the component of the second encoded transmission signal 41 is denoted by "CH-2", such that the component of the first encoded transmission signal 19 and the component of the second encoded transmission signal 41 can be easily distinguished from each other. The time waveform that is illustrated in FIG. 4, (3) is the time waveform of the first encoded transmission signal 19. Accordingly, the time waveform that is illustrated in FIG. 4, (3) and the time waveform of the component of the first encoded transmission signal 19 illustrated in FIG. 4, (4) overlap each other on the time axis.

Figure 5:
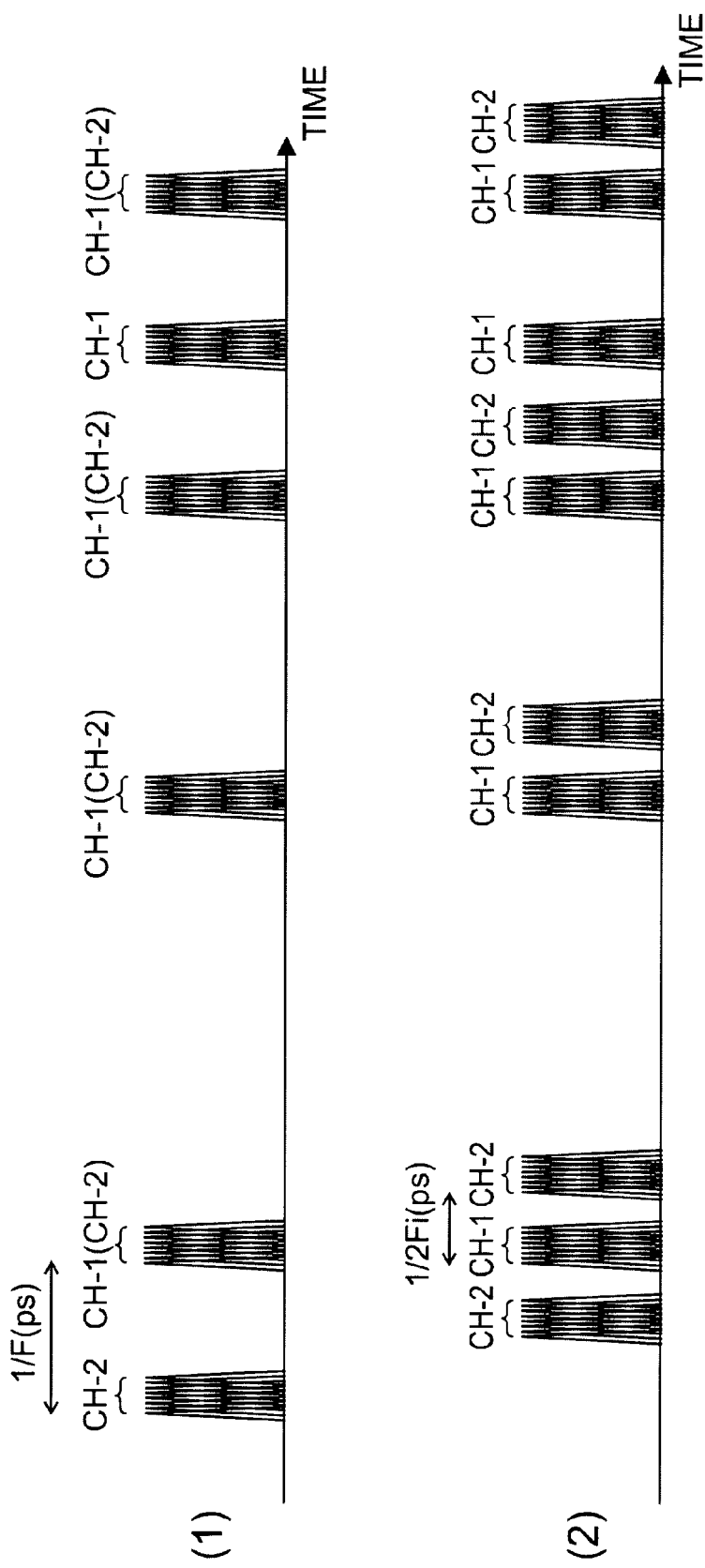
FIG. 5 illustrates a change between time waveforms of 2-OTDM/OCDM signals, when positions of time slots allocated to first and second channels on a time axis are arranged at an equivalent interval and a non-equivalent interval, respectively.

Referring to FIG. 5, a situation where the time slots are equivalently allocated to the first and second channels by changing the time delay amount Δt set to the optical delayer will be described.

FIG. 5 illustrates a change between a time waveform of a 2-OTDM/OCDM signal 43, when positions of the encoded transmission signals of the first and second channels on a time axis are arranged at an equivalent interval and a non-equivalent interval, respectively. FIG. 5, (1) illustrates a time waveform of the 2-OTDM/OCDM signal 43 when the positions of the time slots on the time axis overlap at the same position in the first and second channels. FIG. 5, (2) illustrates a time waveform of the 2-OTDM/OCDM signal 43 when the positions of the encoded multiplex signals of the first and second channels on the time axis are set at an equivalent interval by adding the time delay to the second encoded transmission signal 39 by the optical delayer 40.

The second encoded transmission signal 41 is generated by adding the time delay to the second encoded transmission signal 39 by the optical delayer 40. Accordingly, depending on a value of the time delay amount Δt that is applied by the optical delayer 40, in the time waveform of the 2-OTDM/OCDM signal 43, the positions of the time slots on the time axis overlap each other at the same position in the first and second channels, as illustrated in FIG. 5, (1). In FIG. 5, (1), "CH-1(CH-2)" is displayed to indicate that the time slots of the first and second channels overlap each other.

That is, depending on the value of the time delay amount Δt, the chip pulse group of the first channel and the chip pulse group of the second channel overlap each other on the time axis. Accordingly, if the above-described time delay amount Δt is adjusted, the positions of the time slots of the first and second channels on the time axis may be set to be arranged at an equivalent interval. The time waveform of the 2-OTDM/OCDM signal 43 when the above state is realized becomes a waveform illustrated in FIG. 5, (2). An object of the invention is to calculate the value of the time delay amount Δt satisfying the above condition. When the positions of the time slots allocated to the first and second channels on the time axis are arranged at an equivalent interval, the encoded transmission signals of the first and second channels are arranged at an equivalent interval on the time axis.

If FIG. 5, (1) and (2) are compared with each other, the following fact may be observed. That is, as illustrated in FIG. 5, (1), when the positions of the time slots on the time axis overlap each other at the same position in the first and second channels, the placement interval of the chip pulse groups of the first and second channels on the time axis is always 1/F Hz. Accordingly, there is no place where the placement interval is 1/2F Hz.

Meanwhile, as illustrated in FIG. 5, (2), when the placement interval of the chip pulse groups of the first and second channels on the time axis is equidistant, the placement interval of the chip pulse groups on the time axis is mainly 1/2F Hz. In the case where the time waveform becomes the time waveform illustrated in FIG. 5, (2) by adjusting the time delay amount $\Delta t$, the number of places where the placement interval of the chip pulse groups on the time axis becomes 1/2F Hz is largest.

Accordingly, when the 2-OTDM/OCDM signal 43 is spectrally decomposed, the frequency components of F Hz and the frequency components of 2F Hz in the 2-OTDM/OCDM signal 43 are changed in response to the time delay amount $\Delta t$. For example, if one of the frequency components of F Hz and the frequency components of 2F Hz increases, the other decreases. When the time waveform becomes the time waveform illustrated in FIG. 5, (2), the strength of the frequency components of 2F Hz is maximized and the strength of the frequency components of F Hz is minimized.

However, the frequency component of F Hz or the frequency component of 2F Hz is an extraordinary high frequency component that is generally represented in a unit of GHz. For this reason, it is difficult to observe the frequency components using the common spectrum analyzer. Accordingly, the 2-OTDM/OCDM signal 43 is modulated by a modulation signal having a frequency (F−ΔF) Hz. If the strength of the $\Delta f$ Hz frequency component of the generated modulated OTDM/OCDM signal 47 is observed, the 2F Hz frequency component of the OTDM/OCDM signal is indirectly observed. In this case, $\Delta f$ is defined as a real number satisfying the condition $\Delta f > 0$ and F is defined as a real number satisfying the condition $F > \Delta f$.

Accordingly, first, the modulation signal where the frequency is (F−Δf) Hz needs to be generated. A method of generating the modulation signal will be described with reference to FIG. 1.

The basic clock signal 61 of F Hz is output from the oscillator 60. The basic clock signal 61 is branched into basic clock signals 63-1 and 63-2 by the electric branching device 62. The basic clock signal 63-2 is supplied to a mixer 66 and mixed with a sine-wave signal 65 that is output from the oscillator 64 and has a frequency of $\Delta f$ Hz, and a source modulation signal 67 is generated.

The basic clock signal 63-2 is a basic clock signal of F Hz. Accordingly, if the magnitude of amplitude is defined as C, the basic clock signal is given by $C \sin 2\pi Ft$. Meanwhile, the sine-wave signal 65 where the frequency is $\Delta f$ Hz is given by $D \sin 2\pi\Delta ft$, if the magnitude of amplitude is defined as D. Accordingly, the source modulation signal 67 that is output from the mixer 66 is given by the following Equation (2).

$$C \sin 2\pi Ft \times D \sin 2\pi\Delta ft = (CD/2)\{\cos 2\pi(F-\Delta f)t - \cos 2\pi(F+\Delta f)t\} \quad (2)$$

The component of the source modulation signal 67 where the frequency is (F−Δf) Hz is selected by the band-pass filter 68, and the modulation signal 69 having the frequency (F−Δf) Hz is generated and output. An amplifier 70 is used to amplify the strength of the modulation signal 69 to the strength needed to drive the optical modulator. The modulation signal 71 that is output from the amplifier 70 is a sine-wave signal having the frequency (F−Δf) Hz. In this case, the phase of the modulation signal 71 that is the sine-wave signal is ignored, and the magnitude of the amplitude is assumed as B. As a result, the signal waveform may be represented as $B \sin 2\pi(F-\Delta f)t$. In this way, the modulation signal 71 having the frequency (F−Δf) Hz is generated.

The 2-OTDM/OCDM signal 45-2 is modulated using the modulation signal 71 having the frequency (F−Δf) Hz by the optical modulator 46. As represented in the above Equation (1), the modulated OTDM/OCDM signal 47 that is given, by the sum of the signal component where the frequency is (2F−Δf) Hz and the signal component where the frequency is Δf Hz is obtained. For convenience of explanation, Equation (1) is reproduced below.

$$A \sin 2\pi Ft \times B \sin 2\pi(F-\Delta f)t = (AB/2)\cos 2\pi\Delta ft - (AB/2)\cos 2\pi(2F-\Delta f)t \quad (1)$$

As described above, if the signal component where the frequency is F Hz is minimized, this corresponds to the case where the value of A corresponding to the amplitude coefficient of $A \sin 2\pi\pi Ft$ in Equation (1) is minimized. In this case, the magnitude of the amplitude coefficient (AB/2) of (AB/2) $\cos 2\pi\Delta ft$ that corresponds to the first term of the right side of Equation (1) is minimized, when the value of A is minimized.

Accordingly, the time slots are equivalently distributed to the first encoded transmission signal 19 and the second encoded transmission signal 39, and the time delay amount $\Delta t$ is added to the second encoded transmission signal 39 such that the 2F Hz signal frequency component of the 2-OTDM/OCDM signal 45-2 is maximized. In this case, if the amplitude coefficient (AB/2) of the first term of the right side that is given by $(AB/2)\cos 2\pi\Delta ft$ of the above Equation (1) has a minimum value, the strength of the $\Delta f$ Hz frequency component is minimized.

Therefore, according to the method of generating the OTDM/OCDM transmission signal, in the Δf signal component extracting step, the 2-OTDM/OCDM signal 45-2 is modulated by a modulation signal 71 having a frequency (F−Δf) Hz, and the strength of the Δf Hz signal component in the 2-OTDM/OCDM signal 45-2 modulated by the modulation signal 71 is detected.

Figure 6:
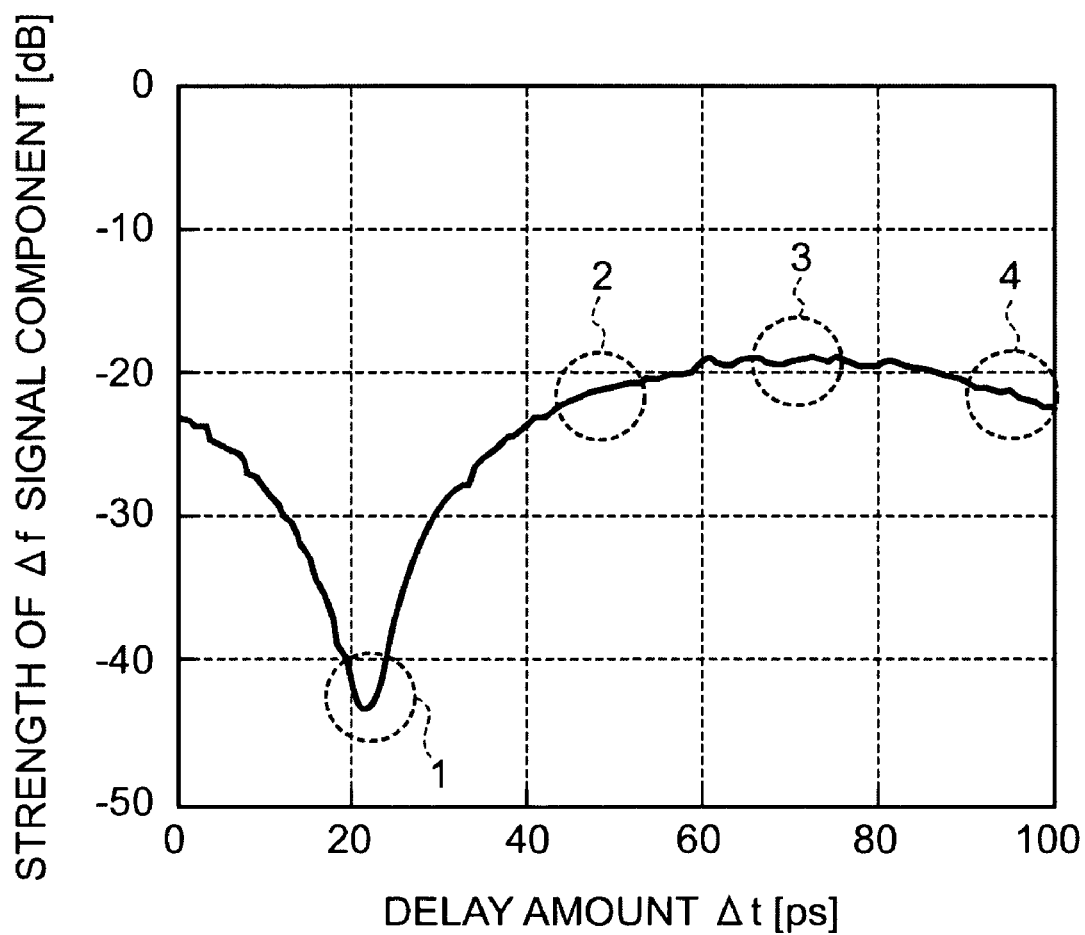
FIG. 6 is a diagram illustrating a relationship between the time delay amount Δt and the strengths of signal components that are included in an electric modulation OTDM/OCDM signal and have a frequency of Δf Hz.
Figure 7A:
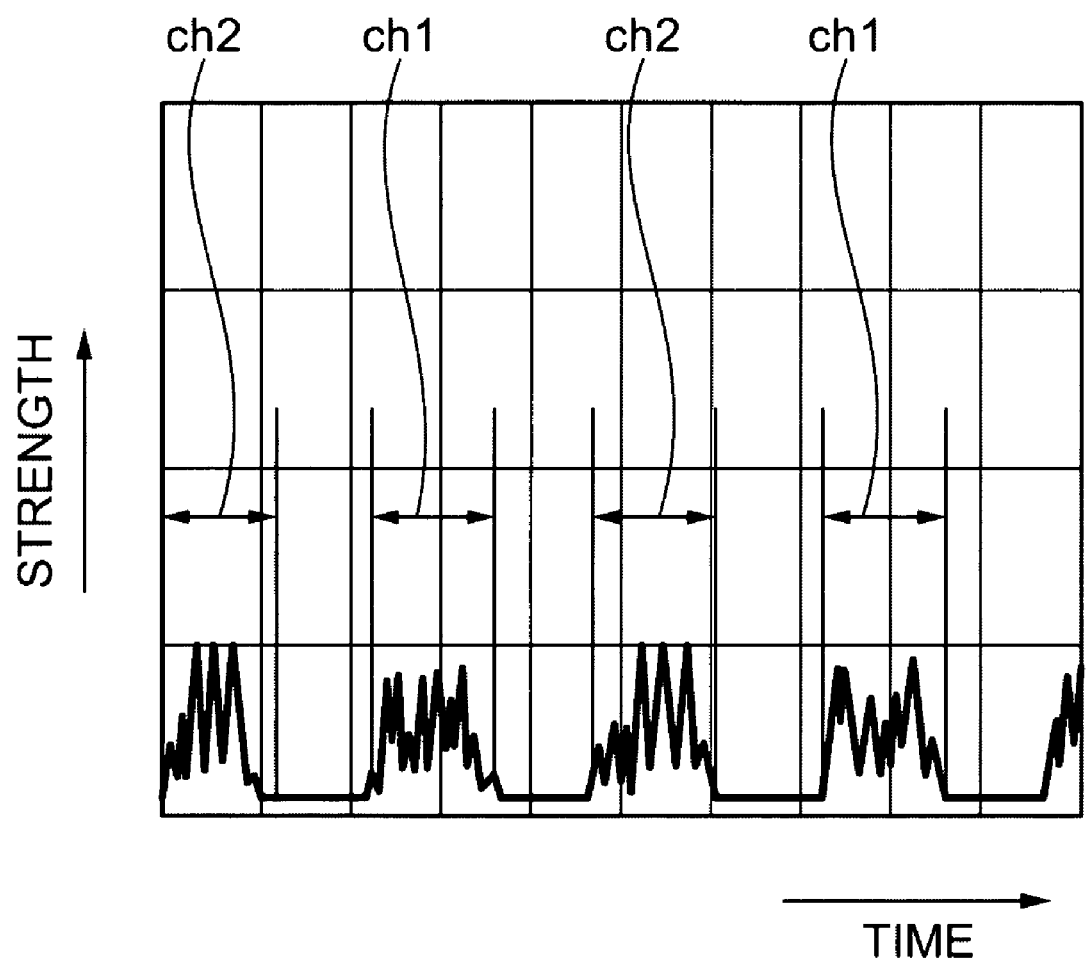
FIG. 7A is a diagram illustrating time waveforms of 2-OTDM/OCDM signals when the time delay amount Δt is set as 21.4 ps.
Figure 7B:
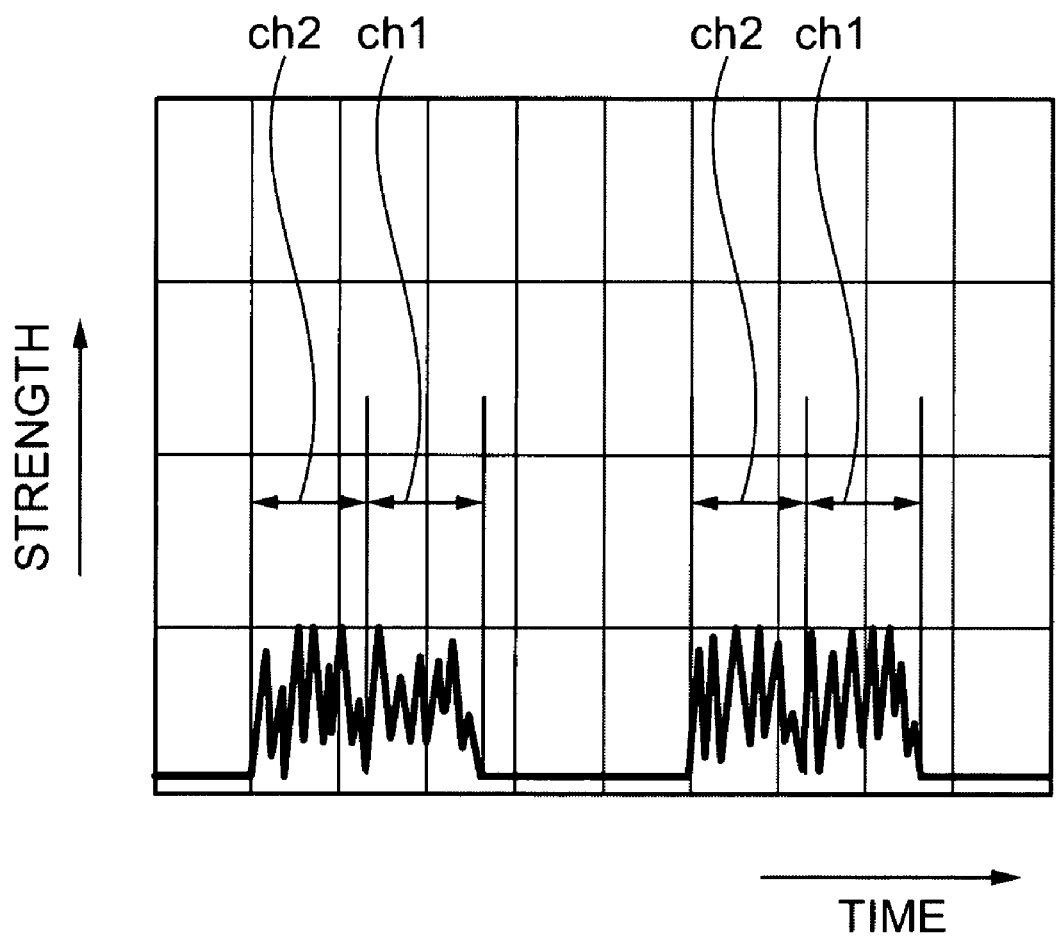
FIG. 7B is a diagram illustrating time waveforms of 2-OTDM/OCDM signals when the time delay amount Δt is set as 47.9 ps.
Figure 7C:
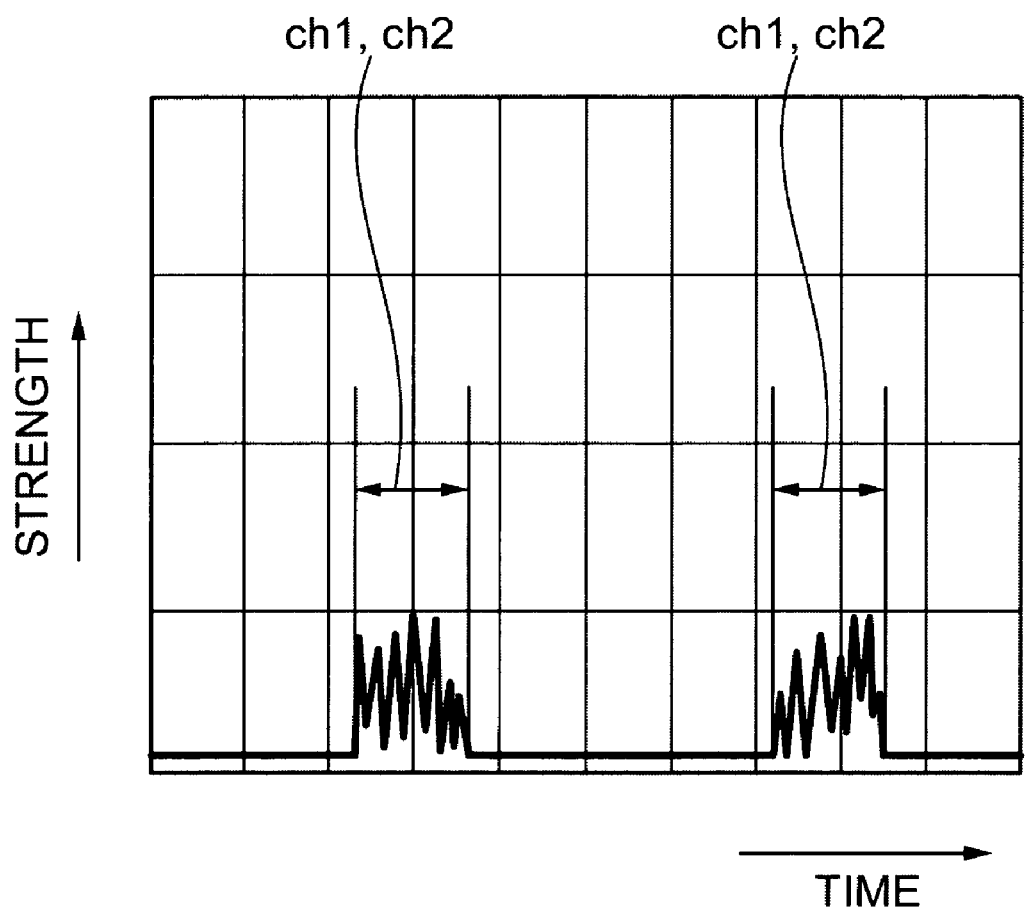
FIG. 7C is a diagram illustrating time waveforms of 2-OTDM/OCDM signals when the time delay amount Δt is set as 71.2 ps.
Figure 7D:
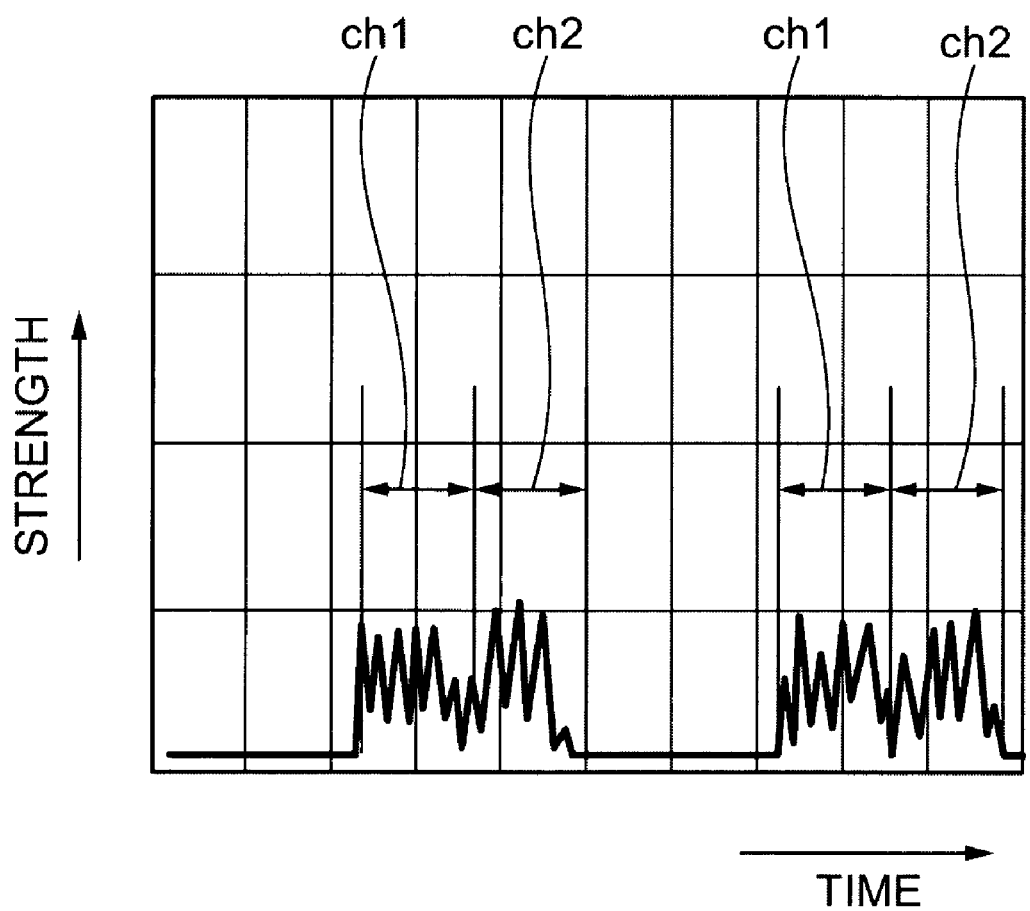
FIG. 7D is a diagram illustrating time waveforms of 2-OTDM/OCDM signals when the time delay amount Δt is set as 94.9 ps.

Referring to FIG. 6, a relationship between the time delay amount $\Delta t$ added to the second encoded transmission signal 39 by the optical delayer 40 and the strength of the $\Delta f$ Hz frequency component in the electrical modulation OTDM/OCDM signal 49 will be described. FIG. 6 is a diagram illustrating a relationship between the time delay amount $\Delta t$ and the strength of the signal component that is included in the electrical modulation OTDM/OCDM signal 49 having a frequency of $\Delta f$ Hz. In FIG. 6, a horizontal axis indicates the time delay amount $\Delta t$ in a ps unit using scale marks and a vertical axis indicates the strength of the $\Delta f$ Hz signal frequency component in a dB unit using scale marks.

In FIG. 6, the relationship between the time delay amount $\Delta t$ and the strength of the signal component where a frequency is $\Delta f$ Hz is a result that is obtained by performing an experiment, under the condition of F Hz=9.95328 GHz and Δf=250 MHz (=0.25 GHz). If the time delay amount $\Delta t$ is set as 21 ps, the strength of the signal component that is included in the electrical modulation OTDM/OCDM signal 49 and has a frequency of Δf Hz has a minimum value (refer to (1) of FIG. 6).

The value of $\Delta f$ Hz that is a frequency output from the oscillator 64 may be set in a range where the frequency may be easily observed using the spectrum analyzer, which is commercially available. As described above, if the value of Δf Hz is set as Δf=250 MHz (=0.25 GHz), the frequency may be easily observed using the spectrum analyzer, which is commercially available.

Referring to FIGS. 7A to 7D, the time waveforms of the 2-OTDM/OCDM signal 43 for which the time delay amounts Δt are set as 21 ps, 48 ps, 71 ps, and 94 ps (illustrated by (1), (2), (3), and (4), respectively, in FIG. 6) will be described. FIGS. 7A to 7D are diagrams illustrating the time waveforms of the 2-OTDM/OCDM signal 43 when the time delay amounts Δt are set as 21 ps, 48 ps, 71 ps, and 94 ps, respectively. In FIGS. 7A to 7D, the chip pulse groups of the first and second channels are denoted by "ch1" and "ch2", respectively, to be easily viewed.

As described above, when the time delay amount Δt is 21 ps, the strength of the component that is included in the electrical modulation OTDM/OCDM signal 49 and has a frequency of Δf Hz has a minimum value. That is, in this case, the time slots are equivalently allocated in the first and second channels, as apparent from FIG. 7A. From FIGS. 7B to 7D where the time delay amount Δt is out of 21 ps, it may be seen that the time slots are not equivalently allocated in the first and second channels.

Accordingly, in the case of the 2-channel OTDM/OCDM transmission signal generating apparatus, if the time delay is applied to the second encoded transmission signal 39 such that the time delay amount Δt becomes Δt=21 ps, the encoded transmission signals of the first and second channels are arranged at an equivalent interval on the time axis.

In the case of the $2^N$-channel OTDM/OCDM transmission signal generating apparatus, if the time delay amounts $(1/2^{N-1}) \times (21\text{ ps})$, $(2/2^{N-1}) \times (21\text{ ps})$, $(3/2^{N-1}) \times (21\text{ ps})$, and $\{(2^{N-1})/2^{N-1}\} \times (21\text{ ps})$ equal to the integral multiple of the time delay amount $1/2^{N-1} \times (21\text{ ps})$ are sequentially applied to the optical delayers of the second to $2^N$-th encoded transmission signal generators 120-2 to 120-$2^N$, the encoded transmission signals 121-1 to 121-$2^N$, the encoded transmission signals 121-1 to 121-$2^N$ that are output from the first to $2^N$-th encoded transmission signal generators 120-1 to 120-$2^N$ are arranged at an equidistant interval on the time axis.

In this case, an example of a basic method to calculate the time delays applied to the encoded transmission signals of the first to M-th channels on the basis of the time delay amount Δt calculated in the time delay amount determining step, when optical pulse signals of M channels (M is an integer of 2 or more) are encoded and multiplexed, is illustrated.

When the optical pulse signals of the M channels are encoded and multiplexed, all of the encoded transmission signals of the first to M-th channels need to be inserted into the time slot of 2Δt. That is, the encoded transmission signals of the first to M-th channels may be arranged at an equidistant interval of 1/M of 2Δt on the time axis. Accordingly, in order to adjust the encoded transmission signals output from the first to M-th encoded transmission signal generators to be arranged at an equidistant interval on the time axis, the time delay amounts 2Δt/M, 2×(2Δt/M), 3×(2Δt/M), . . . , and (M−1)×(2Δt/M) equal to the integral multiple of the time delay amount 2Δt/M determined on the basis of the above-described time delay amount Δt may be sequentially set to the optical delayers that are included in the second to M-th encoded transmission signal generators.

When M is given as $M=2^N$, as described above, the time delay amounts $(1/2^{N-1})\Delta t$, $(2/2^{N-1})\Delta t$, $(3/2^{N-1})\Delta t$, . . . , and $\{(2^N-1)/2^{N-1}\}\Delta t$ equal to the integral multiple of the time delay amount $2\Delta t/2^N = \Delta t/2^{N-1}$ determined on the basis of the time delay amount Δt calculated in the time delay amount calculating step may be sequentially set to the optical delayers that are included in the second to $2^N$-th encoded transmission signal generators.

When the optical pulse signals of the M channels whose bit rate is F bit/s are encoded and multiplexed, in addition to inserting of all of the encoded transmission signals of the first to M-th channels in the time slot of 2Δt, the time slot St may need to be separately secured in the time slot of 2Δt. In this case, St is a real number that satisfies the condition 0<δt<2Δt. However, in actuality, δt is generally set to a value sufficiently smaller than 2Δt.

In this case, the encoded transmission signals that are output from the first to M-th encoded transmission signal generators are adjusted to be arranged at an equivalent interval on the time axis, in the remaining time slot other than the time slot δt. That is, in this case, (2Δt−δt)/M is used as the time delay amount that is determined on the basis of the above-described time delay amount Δt.

The time delay amounts (2Δt−δt)/M, 2×(2Δt−δt)/M, 3×(2Δt−δt)/M, . . . , and (M−1)×(2Δt−δt)/M equal to the integral multiple of (2Δt−δt)/M may be sequentially set to the optical delayers that are included in the second to M-th encoded transmission signal generators, respectively.

What is claimed is:

1. A method of generating time-division multiplexed encoded transmission signals, comprising:

encoding optical pulse signals for each of a plurality of multiplexed channels whose bit rate is F bit/s and generating a transmission signal for each channel;

performing time division multiplexing on first and second transmission signals selected from the transmission signals of the plurality of multiplexed channels and generating a 2-channel multiplexed signal;

modulating the multiplexed signal with a modulation signal having a frequency of (F−Δf) Hz, where Δf is defined as a real number satisfying the condition Δf>0 and F is defined as a real number satisfying the condition F>Δf;

detecting a strength of a Δf Hz frequency component of the multiplexed signal modulated by the modulation signal;

changing a time delay amount of the second transmission signal with respect to the first transmission signal, and determining a time delay amount at which a strength of the Δf Hz frequency component is minimized; and applying a time delay to the transmission signal of each of the multiplexed channels on the basis of the determined time delay amount, and adjusting the transmission signals of the individual channels such that they are arranged at equidistant intervals on a time axis.

2. A method of generating time-division multiplexed encoded transmission signals, comprising:

encoding an optical pulse signal of a first channel whose bit rate is F bit/s and generating and outputting a first transmission signal;

encoding an optical pulse signal of a second channel whose bit rate is F bit/s and generating and outputting a second transmission signal;

inputting the second transmission signal and applying a time delay to the second transmission signal;

performing time division multiplexing on the first transmission signal and the second transmission signal to which the time delay has been applied, and generating a 2-channel multiplexed signal;

modulating the multiplexed signal with a modulation signal having a frequency (F−Δf) Hz, where Δf is defined as a real number satisfying the condition Δf>0 and F is defined as a real number satisfying the condition F>Δt and generating a modulated multiplexed signal;

converting the modulated multiplexed signal into an modulated multiplexed electrical signal and outputting the modulated multiplexed electrical signal;

changing the time delay amount applied to the second transmission signal, and determining a time delay amount at which the strength of Δf Hz frequency component of the modulated multiplexed electrical signal is minimized; and setting the time delay of the second encoded transmission signal on the basis of the determined time delay amount, and adjusting the first and second encoded transmission signals such that they are arranged at equidistant intervals on a time axis.

3. A method of generating time-division multiplexed encoded transmission signals, comprising:

encoding optical pulse signals of $2^N$ channels (N is an integer of 1 or more) whose bit rate is F bit/s, and generating transmission signals;

inputting a second transmission signal corresponding to one transmission signal of first and second transmission signals selected from the transmission signals of the $2^N$ channels, and applying a time delay to the second transmission signal to generate a delayed second transmission signal;

performing time division multiplexing on the first transmission signal and the delayed second transmission signal and generating 2-channel multiplexed signal;

modulating the multiplexed signal by a modulation signal having a frequency (F−Δf) Hz, when Δf is defined as a real number satisfying the condition Δf>0 and F is defined as a real number satisfying the condition F>Δf, and generating a modulated multiplexed signal;

converting the modulated multiplexed signal into a modulated multiplexed electrical signal and outputting the modulated multiplexed electrical signal;

changing the time delay amount applied to the second transmission signal, and determining the time delay amount Δt which the strength of a Δf Hz frequency component of the modulated multiplexed electrical signal is minimized; and sequentially adding the time delay amounts $(1/2^{N-1})\Delta t$, $(2/2^{N-1})\Delta t$, $(3/2^{N-1})\Delta t$, ..., and $\{(2^N-1)/2^{N-1}\}\Delta t$ which are integral multiples of the time delay amount $\Delta t/2^{N-1}$ determined on the basis of the determined time delay amount Δt, to the transmission signals of the second to $2^N$-th channels, generating delayed second to $2^N$-th transmission signals, and adjusting the transmission signals of the individual channels such that they are arranged at equidistant intervals on a time axis; and performing time division multiplexing on the transmission signal of the first channel and the delayed second to $2^N$-th transmission signals to which the time delay amounts are respectively added, and generating a multiplexed transmission signal.

4. An apparatus for generating time-division multiplexed encoded transmission signals, comprising:

encoded transmission signal generators that encode optical pulse signals whose bit rate is F bit/s and output generated transmission signals, the number of the encoded transmission signal generators corresponding to the number of a plurality of multiplexed channels;

an optical multiplexer that performs time division multiplexing on first and second transmission signals output from two encoded transmission signal generators selected from the encoded transmission signal generators, and generates a 2-channel multiplexed signal;

a spectrum analyzer that modulates the multiplex signal by a modulation signal having a frequency (F−Δf) Hz, where Δf is defined as a real number satisfying the condition Δf>0 and F is defined as a real number satisfying the condition F>Δf, and detects a strength of a Δf Hz frequency component in the multiplexed signal modulated by the modulation signal; and a optical delay amount controller that changes the time delay amount of the second transmission signal with respect to the first transmission signal, determines the time delay amount Δt which the strength of the Δf Hz frequency component is minimized, sets the time delay amount of the transmission signal of each of the multiplexed channels on the basis of the determined time delay amount Δt, and adjusts the transmission signals of the individual channels such that they are arranged at equidistant intervals on a time axis.

5. An apparatus for generating time-division multiplexed encoded transmission signals, comprising:

first and second transmission signal generators that encode optical pulse signals whose bit rate is F bit/s, and generate and output generated transmission signals;

an optical delayer disposed in the second transmission signal generator that applies a time delay to a transmission signal output from the second transmission signal generator;

an optical multiplexer that performs time division multiplexing on the first transmission signal and the second transmission signal to which the time delay has been applied, and outputs a 2-channel multiplexed signal;

an optical branching device that branches the multiplexed signal into a multiplexed signal for transmission and a multiplexed signal for monitoring;

an optical modulator that receives the multiplex signal for monitoring, modulates the multiplexed signal for monitoring with a modulation signal whose frequency is (F−Δf) Hz, where Δf is defined as a real number satisfying the condition Δf>0 and F is defined as a real number satisfying the condition F>Δf, and generates a modulated multiplexed signal;

a photoelectric converter that receives the modulated multiplexed signal, converts the modulated multiplexed signal into a modulated multiplexed electrical signal, and outputs the modulated multiplexed electrical signal;

a spectrum analyzer that detects the strength of a Δf Hz frequency component of the modulated multiplex electrical signal; and an optical delay amount controller that sets the optical delayer to the time delay amount to apply a time delay at which the strength of a Δf Hz frequency component is minimized to the second transmission signal, and adjusts the transmission signals of the multiplexed channels such that they are arranged at equidistant intervals on a time axis.

6. An apparatus for generating time-division multiplexed encoded transmission signals, comprising:

first to $2^N$-th (N is an integer of 1 or more) encoded transmission signal generators that encode optical pulse signals whose bit rate is F bit/s, and output generated transmission signals;

optical delayers that are disposed in the second to $2^N$-th encoded transmission signal generators, respectively, to apply time delays to the transmission signals output from the second to $2^N$-th encoded transmission signal generators;

an optical multiplexer that performs time division multiplexing on the transmission signals output from the first to $2^N$-th encoded transmission signal generators and generates a multiplexed transmission signal;

a sub-optical multiplexer that performs time division multiplexing on first and second transmission signals output from first and second encoded transmission signal generators selected from the first to $2^N$-th encoded transmission signal generators and generates a 2-channel multiplexed signal;

an optical modulator that modulates the multiplexed signal by a modulation signal whose frequency is (F−Δf) Hz, when Δf is defined as a real number satisfying the condition Δf>0 and F is defined as a real number satisfying the condition F>Δf, and generates a modulated multiplexed signal;

a spectrum analyzer that detects a strength of a Δf Hz frequency component of a multiplexed signal, which changes according to a change in the time delay amount applied to the second encoded transmission signal; and an optical delay amount controller that changes the time delay amount applied to the second encoded transmission signal, determines a time delay amount Δt which the strength of a Δf Hz frequency component of a modulated multiplexed electrical signal is minimized, sequentially sets the time delay amounts $(1/2^{N-1})\Delta t$, $(2/2^{N-1})\Delta t$, $(3/2^{N-1})\Delta t$, ..., and $\{(2^N-1)/2^{N-1}\}\Delta t$ which are integral multiples of the time delay amount $\Delta t/2^{N-1}$ determined on the basis of the determined time delay amount Δt, to the optical delayers of the second to $2^N$-th encoded transmission signal generators, and adjusts the transmission signals output from the first to $2^N$-th encoded transmission signal generators such that they are arranged at equidistant intervals on a time axis.

* * * * *